June 30, 1925. 1,544,348
E. F. RORKE
APPARATUS FOR PURIFYING AND CONDITIONING WATER
Filed Feb. 14, 1924 2 Sheets-Sheet 1
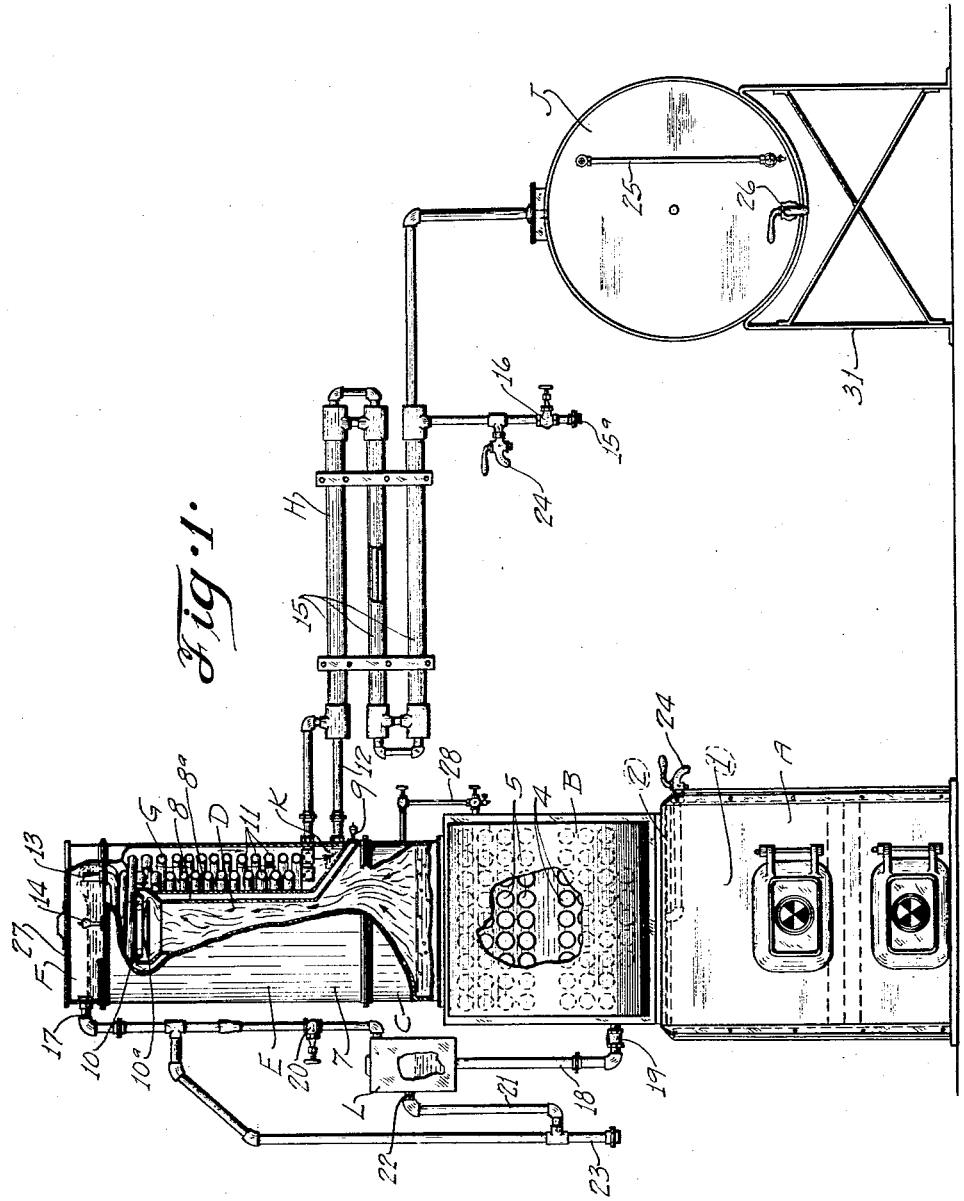
INVENTOR
E.F. Rorke
BY W.B. Dempsey
ATTORNEY

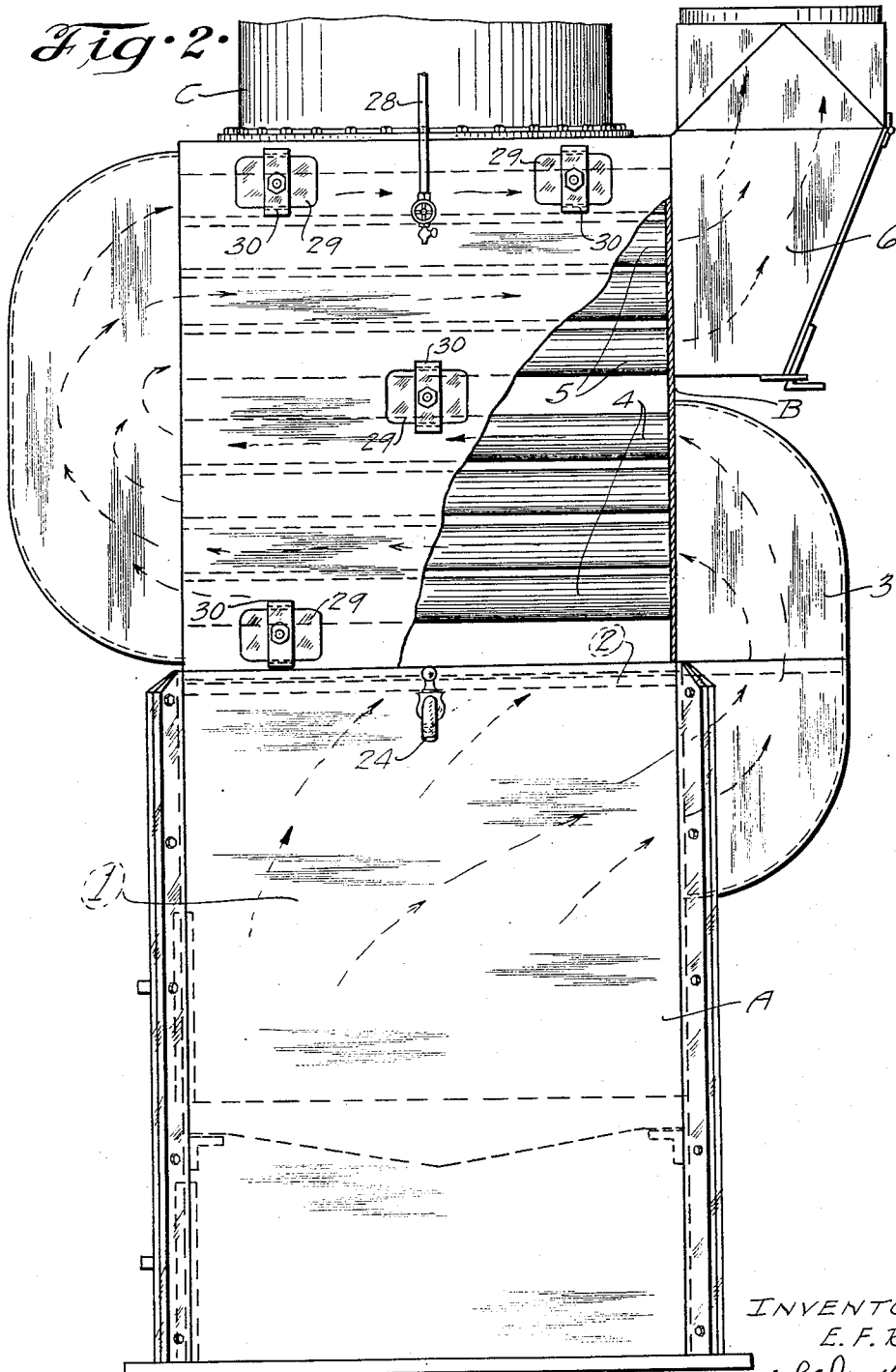

Patented June 30, 1925.

1,544,348

UNITED STATES PATENT OFFICE.

EDWARD F. RORKE, OF ST. LOUIS, MISSOURI.

APPARATUS FOR PURIFYING AND CONDITIONING WATER.

Application filed February 14, 1924. Serial No. 692,780.

*To all whom it may concern:*

Be it known that I, EDWARD FREDERICK RORKE, a citizen of the United States, residing in the city of St. Louis, in the State of Missouri, have invented a new and useful Improvement in an Apparatus for Purifying and Conditioning Water.

My invention relates to that class of water purifying and conditioning apparatus that remove the chemical impurities from water by the process of distillation and remove gaseous impurities by the application of an amount of heat not sufficient to cause vaporization.

An object of my invention is the production of a single, compact unit, built in detachable sections that may be readily disassembled to facilitate handling and shipping and that will occupy relatively small space and yet be economical and efficient.

Another object of my invention is the production of an apparatus that will successfully remove all mineral and gaseous impurities from water by the use of wood, coal, oil or steam for the production of heat.

Another object of my invention is to produce an apparatus in which the process of distillation and condensation takes place at or below atmospheric pressure, in order that it may be tended by persons of average intelligence, thus obviating the necessity of employing a licensed engineer.

A still further object of my invention is to produce a distilling and conditioning apparatus of maximum efficiency, by providing a means of reabsorbing heat from the condensate to raise the temperature of the feed water.

Having reference to the drawings which are made a part of this specification:

Fig. 1 is a front elevation of my complete apparatus, showing portions in section.

Fig. 2 is a side elevation, partly broken away, showing the furnace and fire tube vaporizer.

It is well known in the manufacture of carbonated beverages that if water containing mineral impurities is used, certain chemical actions and reactions take place between the mineral impurities and some of the various flavors and extracts used, and thus the quality of the beverage is deleteriously affected and lacks uniform color, taste and odor.

It is also well known that decaying vegetable and animal matter generates gases, technically known as empyreumatic gases, which if not expelled from the water cause the color of the beverage to become murky or cloudy and often precipitates dregs to the bottom of the containers.

Therefore, it is necessary in the manufacture of carbonated beverages that the water be not only chemically pure, but it also must be free of any mechanically mixed gases as above outlined.

It is also well recognized that if a considerable portion of the air naturally held by the water can be expelled before the process of carbonation begins, the resulting carbonation will be more uniform and economical.

Hence in my improved apparatus I have made provisions for purifying the water of chemical impurities by a process of distillation and also made provision for de-aerating the water and the expulsion of empyreumatic gases, which automatically takes place in a single, compact unit.

My improved apparatus for purifying and conditioning water consists of a furnace (A) which may be designed to use wood, coal, oil or other combustible material; a fire tube vaporizer detachably mounted thereon (B); detachably mounted upon said vaporizer is a vapor ring (C); circumjacent and integral with a vacuum insulated vapor flue (D) is a shell portion (E); detachably mounted upon the shell portion (E) is a gas expelling chamber (F); within the shell portion (E) and surrounding the vacuum insulated vapor flue (D) is positioned a multiple coiled cooling element (G), having its coils staggered relatively to each other and terminating in an open discharge pipe in the gas expelling chamber (F), the other end of the coiled member (G) protruding through the wall of the shell portion (E) and connecting with a multiple fold heat interchanger (H), said heat interchanger being in open communication with a water supply source and a container (J), at one end and at the other end in open communication with the coil cooling element (G) and the condensing chamber (K); an automatic feed regulator (L) is in open communication with the gas removing or dispelling chamber (F) and the vaporizer (B) and also in open communication with a sewer or other convenient receptacle for waste or surplus water.

Referring to Fig. 2, a suitable combustion chamber (1) is provided and so constructed that the combustible gases generated by the heat of cumbustion contact first with the crown sheet (2), which forms the bottom of the fire tube vaporizer. Thus a portion of the heat of the fuel is directly absorbed through the crown sheet. The hot gases flow in the direction of the arrows into a return flue (3), which diverts them in the opposite direction through the fire tubes (4), until they strike the opposite return flue where again the hot gases are diverted in the reverse direction through the upper series of fire tubes (5) and then escape into the breeching (6) and out through the chimney. In this manner practically all the heat of the burning gases has been absorbed by the water surrounding said fire tubes and resting upon said crown sheet. Detachably mounted upon the vaporizer is a vapor ring (C), which materially increases the vapor liberating space so that the vapors are unconfined and remain at atmospheric pressure. Detachably mounted upon the vapor ring (C) is the condensing chamber (K), surrounded by the shell (7). Centrally located within the shell portion (E) and built integrally therewith is the vapor flue (D). Since the temperature of the vapor in said flue must be 212 deg. F, or more, it is evident that unless insulation be provided between the vapor flue (D) and the circumjacent condensing chamber (K), the heat of the vapor would be radiated through the walls of the flue and thus materially raise the temperature within the condensing chamber (K). Therefore, in order to maintain a high temperature in the vapor flue and a low temperature, for the purpose of condensing the vapor in the condensing chamber (K), the vapor flue in made witn double walls (8 and 8ª) hermetically sealed and having the air exhausted therefrom by means of an exhaust pump attached to a connection at (9), said connection being provided with an outwardly opening check valve. Thus a vacuum insulated vapor flue is provided. Should the air be not substantially exhausted from the space between the double walls (8 and 8ª) heat would be transmitted from the vapor, arising through the vapor flue, to the air within the walled space, causing an expansion of the air and its consequent escape through the check valve located at (9). The upper end of the vapor flue (D) is provided with baffle plates (10 and 10ª), which serve to divert the rising vapor into the condensing chamber (K) circumambient thereto, where it is cooled by the low temperature produced by the cooling coils (11), through which the cool feed water flows. By this arrangement, the heat of the vapor is absorbed, causing the vapor to condense and escape through the pipe (12). Thus, while the feed water absorbs heat from the vapor, causing the vapor to condense, the temperature of the feed water has raised to approximately 180 deg. F, a temperature sufficiently high to dispel the empyreumatic gases as the water overflows through the discharge pipe (13) into the gas dispelling chamber (F). A de-aerating valve (14) is located in the gas dispelling chamber (F) and communicates with the condensing chamber (K) through which the heated atmospheric air, liberated in the process of distillation, escapes into the open air. The condensed, distilled water flows from the condensing chamber (K) through the pipe (12), which said pipe is folded back upon itself and surrounded by watertight cylinders (15) through which cooled water from any convenient source of supply flows in contra-direction, said feed water entering by means of the pipe (15ª) and the valve (16). Thus the temperature of the feed water begins to be raised as soon as it starts to flow in the direction of the vaporizer. By thus paralleling and causing the feed water to flow in close proximity to the flow of the heated, distilled water, a large amount of heat that would otherwise be lost is reabsorbed not only for the purpose of dispelling deleterious gases from the water in the gas dispelling chamber but as the feed water flows directly from the gas dispelling chamber through the overflow pipe (17) into the feed water regulator (L) and passes into the lower portion of the vaporizer through the pipe (18), its temperature is but a few degrees below the boiling point. A check valve (19) in pipe (18) prevents the flow of water from the vaporizer into the feed water regulator. A cut-off valve (20) is placed in the pipe line (17), which prevents water from flowing into the feed water regulator box (L), when so desired. An overflow pipe (21) is connected with the feed water regulator at (22) and to a waste pipe (23). The purpose of this construction is to provide a constant water level in the feed water regulator, which automatically regulates the height of the water in the vaporizer. Drain cocks (24) are provided, one at the lowest point of the vaporizer and the other at the lowest point of the heat interchanging element (H) in such a manner that the entire system can be readily drained to the last drop of water. A water guage glass (28) is provided to show that a constant water level is maintained by the automatic feed water regulator box (L). Readily detachable clean-out doors (29), having suitable fastenings (30) are provided to facilitate the cleaning of the fire tubes. A suitable wrought iron stand (31) supports the purified water container (J).

Having fully described my improved apparatus for purifying and conditioning water and its method of operation, what I claim as new and useful and desire to protect by Letters Patent is:

1. A water purifying and conditioning apparatus comprising in combination a furnace having a vaporizer detachably mounted thereon, a vapor ring detachably mounted upon said vaporizer, a cylindrical condensing chamber detachably mounted upon said vapor ring, said condensing chamber having its lower end partially closed by double walls, spaced apart, and turned upwardly so as to form a hollow vapor flue extending upwardly through the longitudinal center of the said condensing chamber so that the double walls of the said vapor flue are positioned concentrically with the enclosing walls of the said condensing chamber, a conduit connecting the space enclosed between said double walls with the external atmosphere, an outwardly opening check valve normally closing said conduit set at atmospheric pressure and adapted to automatically open when the pressure within the space between the said double walls becomes greater than atmospheric pressure by reason of the increased temperature of the air in said space, thereby causing the air in said space to be automatically exhausted.

2. A water purifying and conditioning apparatus comprising in combination a furnace having a vaporized detachably mounted thereon, a vapor ring detachably mounted upon said vaporizer, a cylindrical condensing chamber detachably mounted upon said vapor ring, said condensing chamber having its lower end partially closed by double walls, spaced apart, and turned upwardly so as to form a hollow vapor flue extending upwardly through the longitudinal center of the said condensing chamber, so that the double walls of the said vapor flue are positioned concentrically with the enclosing walls of the said condensing chamber, the space between the said double walls being adapted to have the air exhausted therefrom by means of a conduit and an outwardly opening check valve connecting the said space between the said double walls of the said vapor flue with the external air, the upper end of said vapor flue being provided with baffles, means for cooling said condensing chamber consisting of a multiple-coiled cooling element encircling said vapor flue and positioned wholly within said condensing chamber and in open communication at its lower end with a heat interchanging element located exterially of said condensing chamber and, also, in open communication with a source of cold water supply, said cooling element being in open communication at its upper end with a gas dispelling chamber mounted upon said condensing chamber, said coiled cooling element being adapted to discharge the cooling water into said gas dispelling chamber at a temperature below the boiling point of water.

3. A water purifying and conditioning apparatus comprising in combination a furnace, having a vaporizer detachably mounted thereon, a vapor ring detachably mounted upon said vaporizer, a cylindrical condensing chamber detachably mounted upon said vapor ring, said condensing chamber having its lower end partially closed by double walls, spaced apart, and turned upwardly so as to form a hollow vapor flue extending upwardly through the longitudinal center of the said condensing chamber so that the double walls of the said vapor flue are positioned concentrically with the enclosing walls of the condensing chamber, the space between the said double walls being adapted to have the air exhausted therefrom by means of a conduit and an outwardly opening check valve connecting the said space between the said double walls of the said vapor flue with the external air, the upper end of said vapor flue being provided with baffles, means for cooling said condensing chamber consisting of a multiple-coiled cooling element encircling said vapor flue and positioned wholly within said condensing chamber and in open communication at its lower end with a heat interchanging element located exterially of said condensing chamber and, also, in open communication with a source of cold water supply, said cooling element being, also, in open communication at its upper end with a gas dispelling chamber, mounted upon said condensing chamber, said coiled cooling element being adapted to discharge the cooling water into said gas dispelling chamber at a temperature below the boiling point of water, said gas dispelling chamber being in open communication with the atmosphere and provided with an overflow outlet located at a predetermined height from the bottom of said chamber, a conduit leading from said outlet to a feed water control box positioned at a lower level than the said gas dispelling chamber, a conduit leading from said feed water control box into the vaporizer at a point adjacent the bottom of said vaporizer, and an overflow outlet in said feed water control box from which said outlet a conduit leads to any convenient source for disposing of the waste water.

4. A water purifying and conditioning apparatus comprising in combination a furnace, a vaporizer detachably mounted thereon, a vapor ring mounted upon said vaporizer, a condensing chamber detachably mounted upon said vapor ring, a double walled vapor flue having means for evacuating the air from the space enclosed between said double walls, baffles in the upper end of said vapor flue, a cooling element positioned within said condenser composed of a plurality of coils wound around said vapor flue in staggered relation with each other and positioned concentrically about said vapor flue and spaced apart from said vapor flue and the walls of said condenser, said cooling coils being in open communication at their lower ends with a heat interchanging element located wholly without said condenser, said cooling coils being in open communication at their upper ends with a gas dispelling chamber located upon and integral with the said condensing chamber, a conduit leading from said chamber to a feed water control box positioned at a lower level than the said gas dispelling chamber, a conduit leading from said feed water control box to a source of discharge, a heat interchanging element consisting of parallel folds of two pipes of different diameters, the smaller of which is inserted in the larger, with water-tight connections, so that the cold feed water flowing from a source of supply to the said cooling coils through the larger pipe flows in a direction opposite to the flow of the hot distillate flowing from the condensing chamber to a storage tank through the smaller pipe.

In witness whereof I have hereunto affixed my signature this 11th day of February, 1924, in the presence of two subscribing witnesses.

EDWARD F. RORKE.

Witnesses:
 M. B. DEMPSEY,
 M. CLAWSEY.